United States Patent
Carty (10) Patent No.: US 7,155,167 B1
(45) Date of Patent: Dec. 26, 2006

(54) WIRELESS LAN MONITORING DEVICE

(75) Inventor: Clark A. Carty, Brunswick, OH (US)

(73) Assignee: Cisco Technology, Inc., San Jose, CA (US)

( * ) Notice: Subject to any disclaimer, the term of this patent is extended or adjusted under 35 U.S.C. 154(b) by 885 days.

(21) Appl. No.: 09/911,203

(22) Filed: Jul. 24, 2001

(51) Int. Cl.
*H04B 17/00* (2006.01)
*H03C 1/62* (2006.01)
*H04Q 7/20* (2006.01)

(52) U.S. Cl. .............. 455/67.11; 455/115.1; 455/226.1; 455/423

(58) Field of Classification Search ........ 455/67.11, 455/67.14, 115.1, 115.2, 226.1, 226.4, 423, 455/425
See application file for complete search history.

(56) References Cited

U.S. PATENT DOCUMENTS 5,914,668 A * 6/1999 Chavez et al. ............ 340/7.39
6,771,956 B1 * 8/2004 Beeler ..................... 455/423

OTHER PUBLICATIONS

"RF Site Survey and Antenna Selection for Optimum Wireless LAN Performance," Symbol Technologies, Inc., Jan. 2000, pp. 1-6.

* cited by examiner

*Primary Examiner*—Benny Quoc Tieu
(74) *Attorney, Agent, or Firm*—Tucker Ellis & West LLP (57) ABSTRACT

A handheld mobile wireless monitoring apparatus is disclosed in which a radio receiver monitors a wireless signal across one or more wireless channels. A user interface enables a user to observe and select a predetermined parameter of the wireless signal to be evaluated. A processing circuit evaluates the wireless signal to observe the predetermined parameter. An enclosure is provided, dimensioned to be handheld by the user, for retaining the radio receiver, the processing circuit and the user interface.

14 Claims, 7 Drawing Sheets

WIRELESS LAN MONITORING DEVICE

BACKGROUND OF THE INVENTION

The present invention is directed to the field of wireless Local Area Network (WLAN) technology, particularly diagnostic devices for improving WLAN operation. A WLAN operating under the IEEE 802.11a protocol communicates in the unlicensed 5 GHz frequency band. Most WLANs also operate in the 2.4 GHz band under the IEEE 802.11b protocol. Therefore, many things can interfere with their operation, including microwaves, 2.4 GHz cordless phones, Bluetooth wireless devices, etc.

Figure 1:
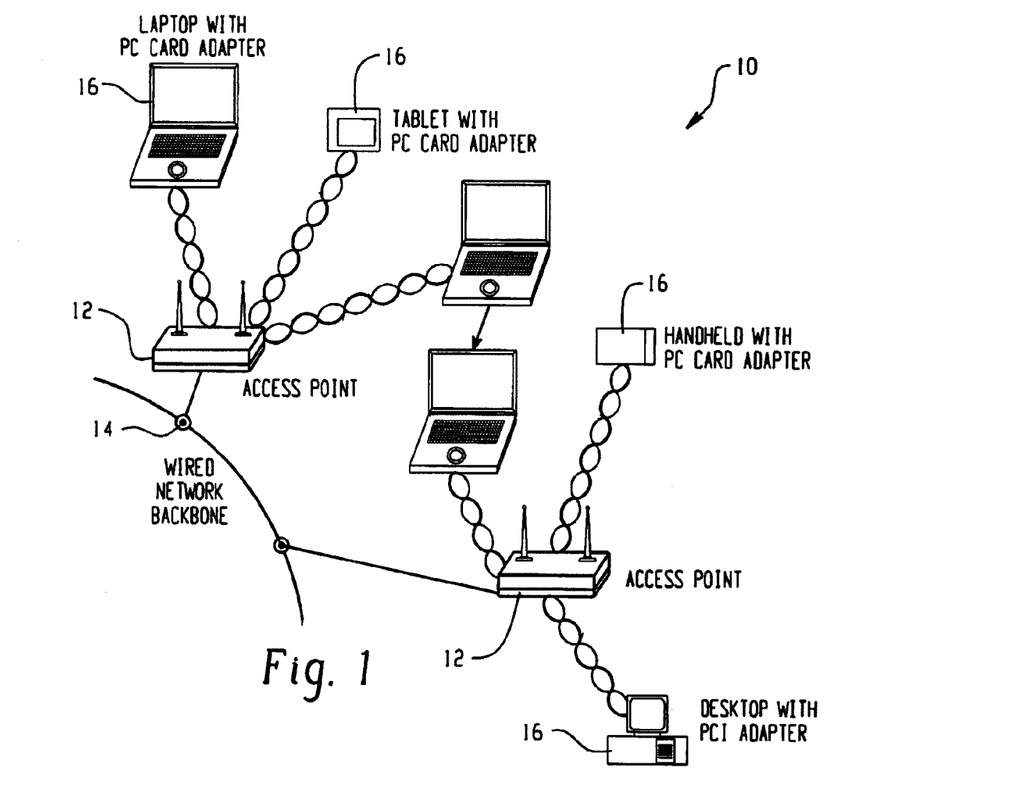
FIG. 1 shows a basic WLAN configuration, as served by the present invention.

An exemplary WLAN configuration is shown in FIG. 1. One or more access points 12 (or APs) are hardwired into a network backbone 14 and communicate wirelessly with a number of wireless clients 16, which can be desktop or laptop computers, handheld units, tablet interfaces, etc. When installing indoor and outdoor 802.11 WLANs, other problems are often encountered with signal reception. Interior walls and pillars, particularly metal structural members can block and/or reduce the strength of transmission signals and thus data transfer rate, in addition to interference from other wireless devices. Other problems result from multi-path interference and echoing. Site surveys are typically performed before installing the WLAN. These surveys are typically performed with a large mobile laptop computer operating with readily-available "packet sniffing" software. However, these devices provide more "computing power" than is necessary for the task, and thus consume much energy, resulting in a short battery life. Also, troubleshooting a WLAN installation typically involves arbitrarily moving around access points 12, AP antennas and/or clients 16, until the transmission strength and data rate is observed to improve. Such a "trial and error" method is not efficient and can add considerably to the time and expense of installing a WLAN.

Figure 2:
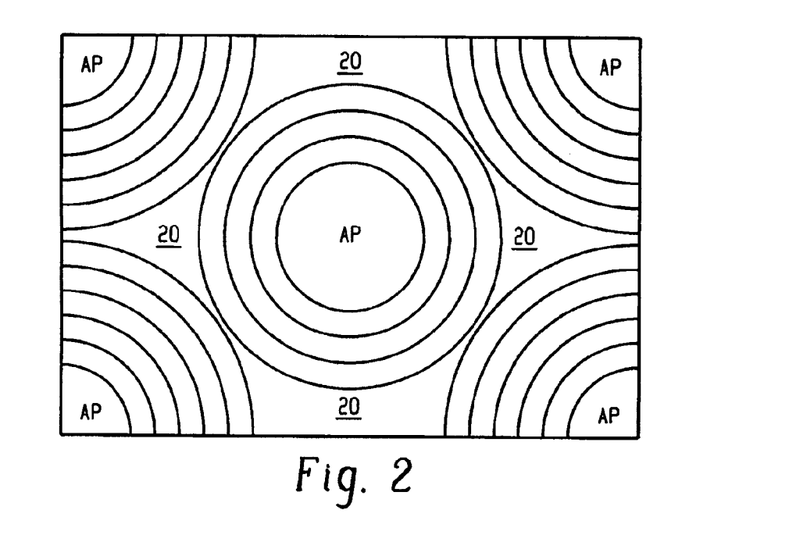
FIG. 2 shows a WLAN topography indicating gaps in the coverage area.

Other problems can be encountered with existing WLAN installations. As seen in FIG. 2, there may be "holes" or "gaps" 20 in an existing WLAN, regions within a service area that are out of range of AP transmission and reception. It can be difficult to identify and pinpoint such gaps 20, or to determine optimum placement of new APs 12 that would supply service to these regions with minimum interference to other WLAN wireless devices. In addition, it is difficult to identify specific APs 12 and clients 16 that may be transmitting and receiving in a particular location within a WLAN. Consequently, it is difficult to independently evaluate the quality of a wireless connection. Conversely, since 802.11 WLANs operate in the unlicensed 2.4 GHz and 5.0 GHz frequency bands, it is possible to violate the security of the WLAN and gain access, particularly if no security protocols are in place.

SUMMARY OF THE INVENTION

In view of the difficulties and drawbacks noted above, there is therefore a need for WLAN monitoring device that assists in site surveys prior to WLAN installations.

There is also a need for a WLAN monitoring device that improves efficiency in WLAN installations.

There is also a need for a handheld WLAN monitoring system that is compact and easy to use.

These is also a need for a portable WLAN device that can locate gaps in existing WLANs.

There is also a need for a portable WLAN device than can evaluate the quality of a wireless connection and determine the potential of security violations.

These needs and others are satisfied by the method and apparatus of the present invention in which a handheld mobile wireless monitoring apparatus is provided. A radio receiver monitors a wireless signal across one or more wireless channels. A user interface enables a user to observe and select a predetermined parameter of the wireless signal to be evaluated. A processing circuit evaluates the wireless signal to observe the predetermined parameter. An enclosure is provided, dimensioned to be handheld by the user, for retaining the radio receiver, the processing circuit and the user interface.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

Figure 3:
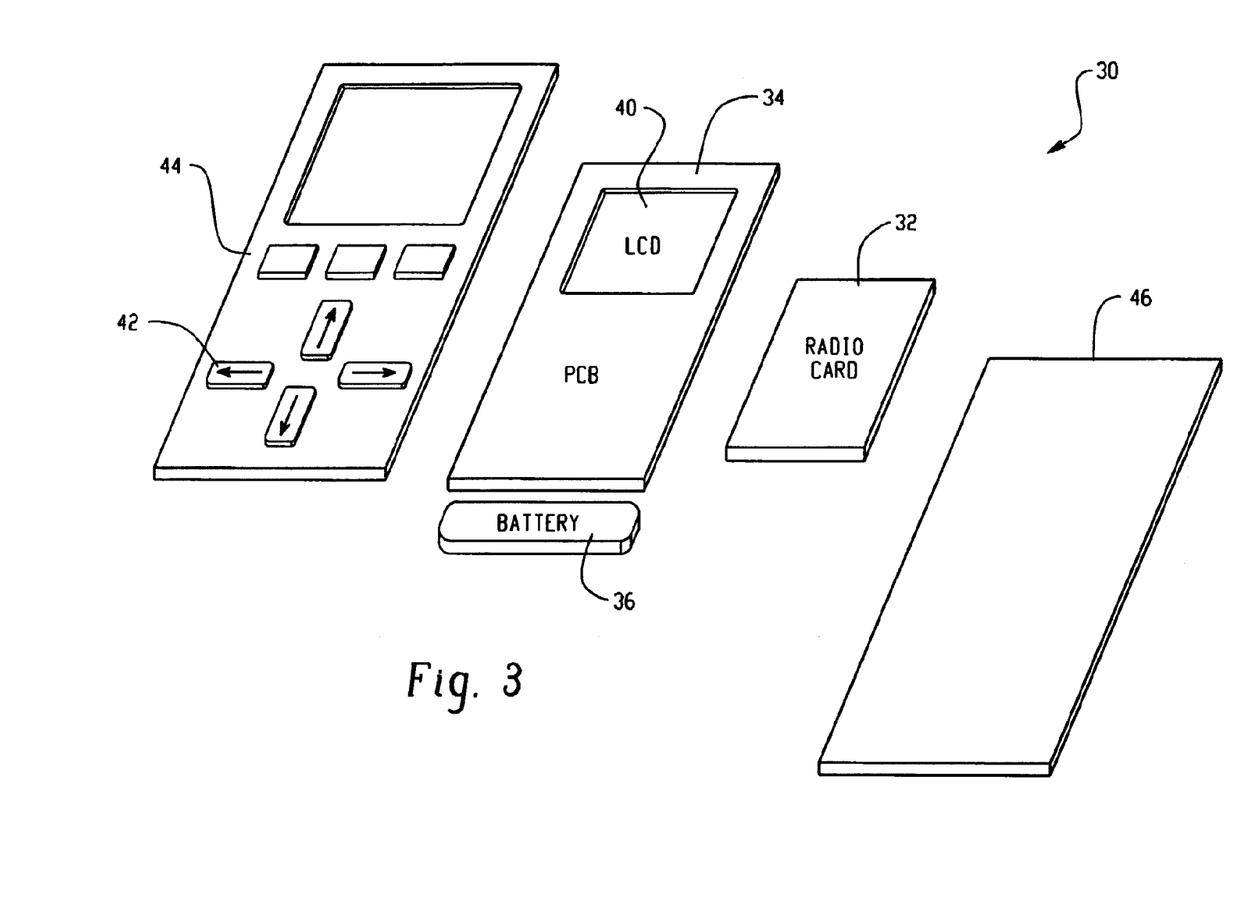
FIG. 3 is an exploded view generally indicating the components of the preferred embodiment.

In accordance with the present invention, a handheld mobile monitoring device is disclosed. As shown in FIG. 3, the present device 30 is preferably about the size of a large calculator. A radio receiver 32 is provided for monitoring a wireless signal across one or more wireless channels. In the preferred embodiment, the radio receiver 32 is a wireless PC Card of the type used for monitoring wireless operating under the IEEE protocols, namely in the unlicensed 2.4 GHz and 5 GHz frequency bands. However, it should be understood the invention could easily be adapted to scan any desired wireless frequency band, without departing from the invention.

A processing circuit 34 is also provided to evaluate the wireless signal to observe a predetermined parameter of the signal. For example, at a given location, the circuit 34 could be used to identify the wireless access points 12 and wireless clients 16 that are transmitting and receiving at that location. The processing circuit 34 can detect the MAC address, 10 of an AP 14 or client 16, within network 10. In this way, the invention can identify rogues attempting to gain access to the WLAN. The invention can detect other parameters of the signal, such as AP association, Service Set Identifier (SSID), Wired Equivalent Privacy (WEP) status, data rate and transmission power strength and any other signal parameters that may occur to those skilled in the art. In this way, the present invention could be used to locate gaps 20 in the signal, by finding regions where such parameters cannot be detected. In regions where these parameters can be detected, the invention would evaluate the signal to determine the quality of the connection between clients and APs at that location.

Figure 4:
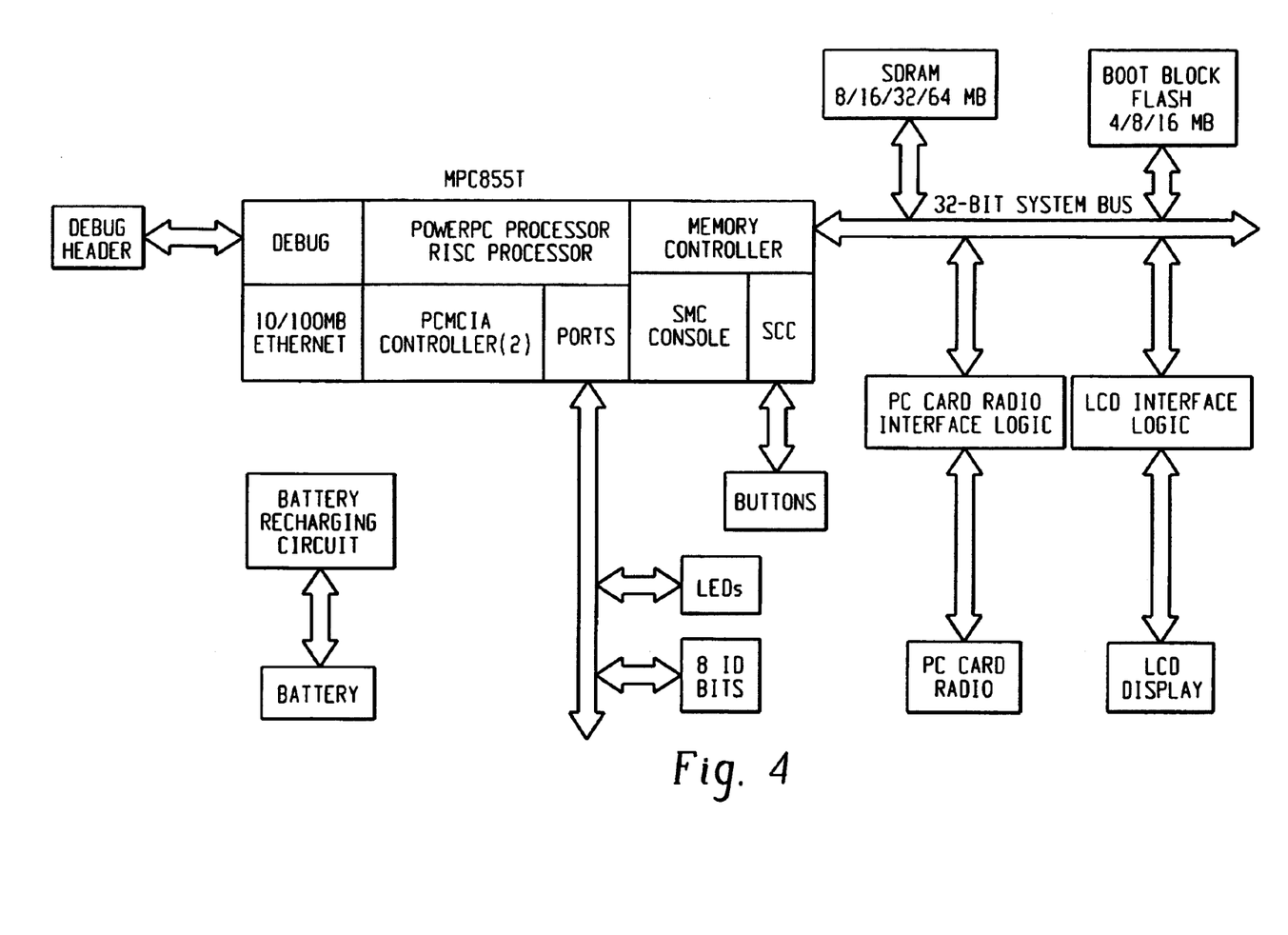
FIG. 4 is a high level block diagram of the preferred embodiment.

In the preferred embodiment, the processing circuit 34 can include a microprocessor mounted on a printed circuit board. As shown in FIG. 4, the processing circuit 34 can include a Power PC microprocessor, SRAM memory and flash memory. The processing circuit 34 can be made of existing Cisco/Aironet components, produced by the present assignee. An existing 350 Series Client PC Card could be used, along with a reduced size and footprint Aironet Series 350 AP PCB, made by Cisco Systems. To reduce the size of this PCB, less memory would be used, and the inline power circuitry would be eliminated. The device 30 operates with a small rechargeable battery 36, with a battery charging circuit interfacing with the printed circuit board. The present device 30 includes a user interface for enabling the user to observe and select the parameter of the wireless signal to be observed. As indicated in FIGS. 3 and 4, the interface includes a liquid crystal display (LCD) 40 for displaying the selected parameter and the various properties associated with that parameter. The processing circuit 34 includes interface logic for the LCD display 40 and also the PC Radio Card 32. The interface also includes a keypad 42 including various operational buttons for selecting the predetermined parameter to be observed. The parameter functions to select preferably include but are not limited to: Access Points, Clients, Options, Quick Statistics, Signal Strength, WLAN Statistics, Host Table, Associations, Packets, Security, Signal Direction, and Options. The interface can also include a plurality of LEDs for indicating various conditions, i.e. alert conditions. Conditions indicated are Data Rate, Channel Number, Signal Strength, SSID, Host Table, Associations, Packets: transmitted, errors, origin, and Signal Direction.

Figure 5A:
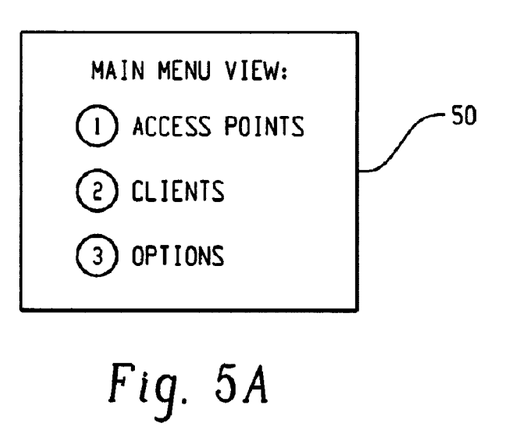
FIGS. 5A, 5B, 5C and 5d are flow charts indicating various menu options for utilizing the present invention.

Exemplary menu selections of the keypad 42 as displayed on the LCD 40 are shown in FIGS. 5A, 5B, 5C and 5D. As shown in FIG. 5A, the Main Menu View 50 of the present invention can be used for accessing information on: 1) Access Points; 2) Clients; and 3) Options. An Access Point Selection menu 52 allows selection of a number of APs within reception range. These APs are indicated A), B), C), D), etc. and identified by an alphanumeric name or address.

Figure 5B:
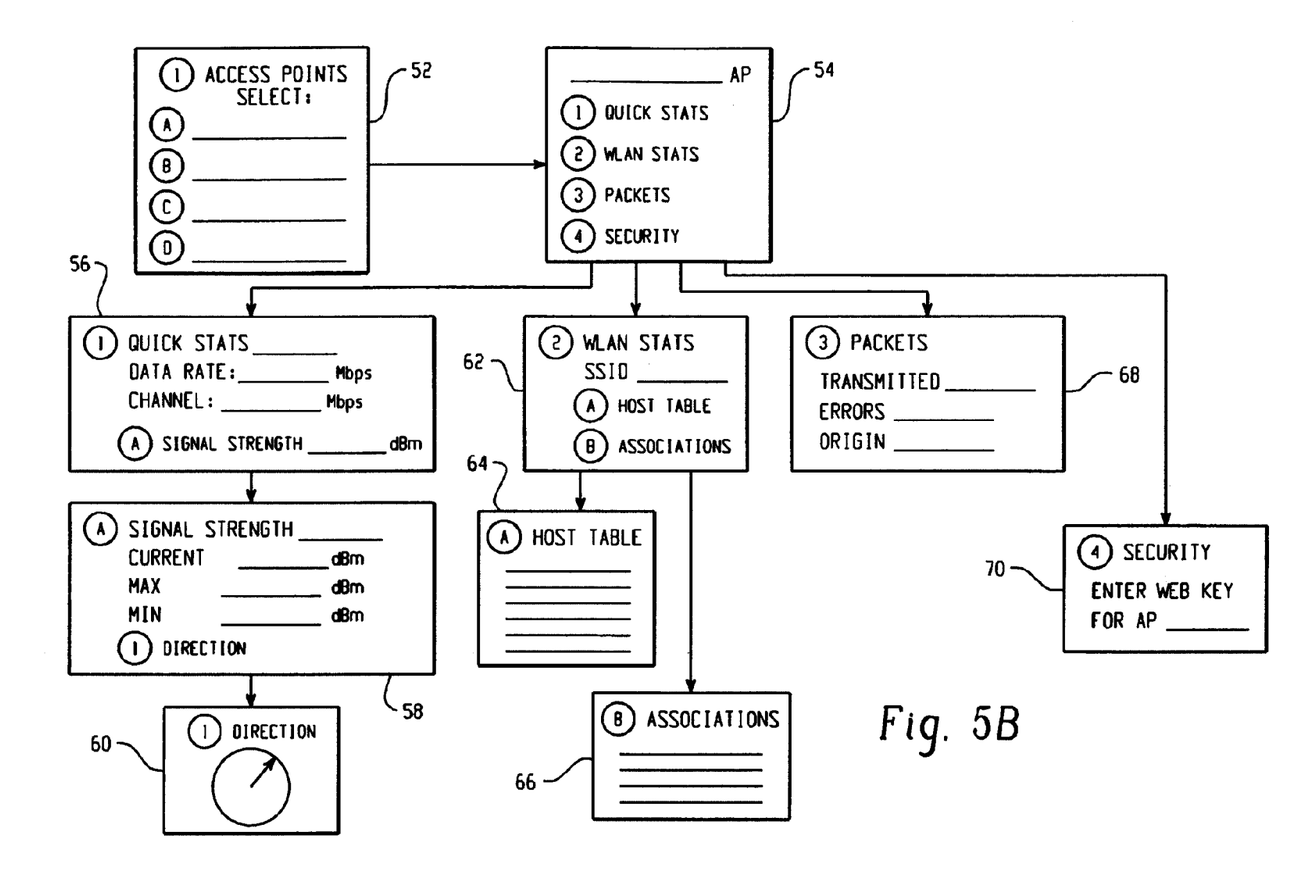

As shown in FIG. 5B, for a selected AP, a Parameter Selection menu 54 is displayed, offering the following menu options: 1) Quick Stats; 2) WLAN Stats; 3) Packets; and 4) Security. The Quick Stats menu 56 can display measured numerical values for Data Rate and Channel bandwidth, as measured in Mbps. A Signal Strength menu 58 can be selected for displaying current measured numerical values of signal strength, and also maximum and minimum values, expressed in dBm. A Signal Direction menu 60 can also be selected with displays signal direction, either relative to the user's orientation, or with respect to a geographical coordinate system, e.g. as azimuth with respect to the "compass points" of direction. A WLAN Stats menu 62 can be selected that allows for selection between A) a Host Table 64 and b) an Associations Table 66, where the names of other network devices can be indicated. The Packets menu 68 includes fields for indicating the number of packets transmitted, the number of transmission errors and the origin of the packets. The Security menu 70 allows the entry of a WEP key for the selected AP.

Figure 5C:
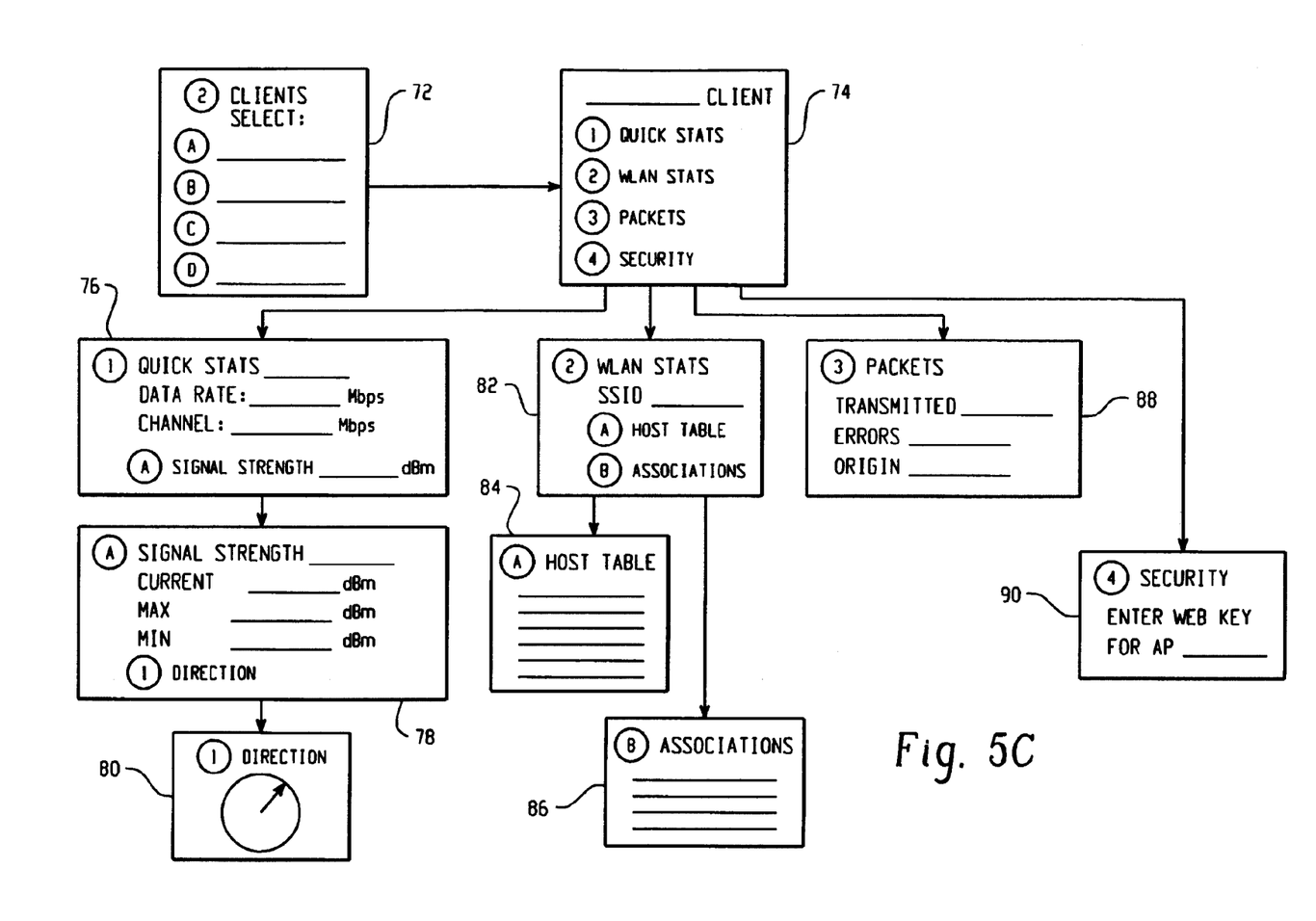

As shown in FIG. 5C, a Client Selection menu 72 offers functions similar to the AP Selection menu 52 and allows selection of a number of clients within reception range. These clients are indicated A), B), C), D), etc. and identified by an alphanumeric name or address. For a selected client, a Parameter Selection menu 74 is displayed, offering the following menu options: 1) Quick Stats; 2) WLAN Stats; 3) Packets; and 4) Security. The Quick Stats menu 76 can display measured numerical values for Data Rate and Channel bandwidth, as measured in Mbps. A Signal Strength menu 78 can be selected for displaying current measured numerical values of signal strength, and also maximum and minimum values, expressed in dBm. A Signal Direction menu 80 can also be selected with displays signal direction, either relative to the user's orientation, or with respect to a geographical coordinate system, e.g. as azimuth with respect to the "compass points" of direction. A WLAN Stats menu 82 can be selected that allows for selection between A) a Host Table 84 and b) an Associations Table 86, where the names of other network devices can be indicated. The Packets menu 88 includes fields for indicating the number of packets transmitted, the number of transmission errors and the origin of the packets. The Security menu 90 allows the entry of a WEP key for the selected AP.

Figure 5D:
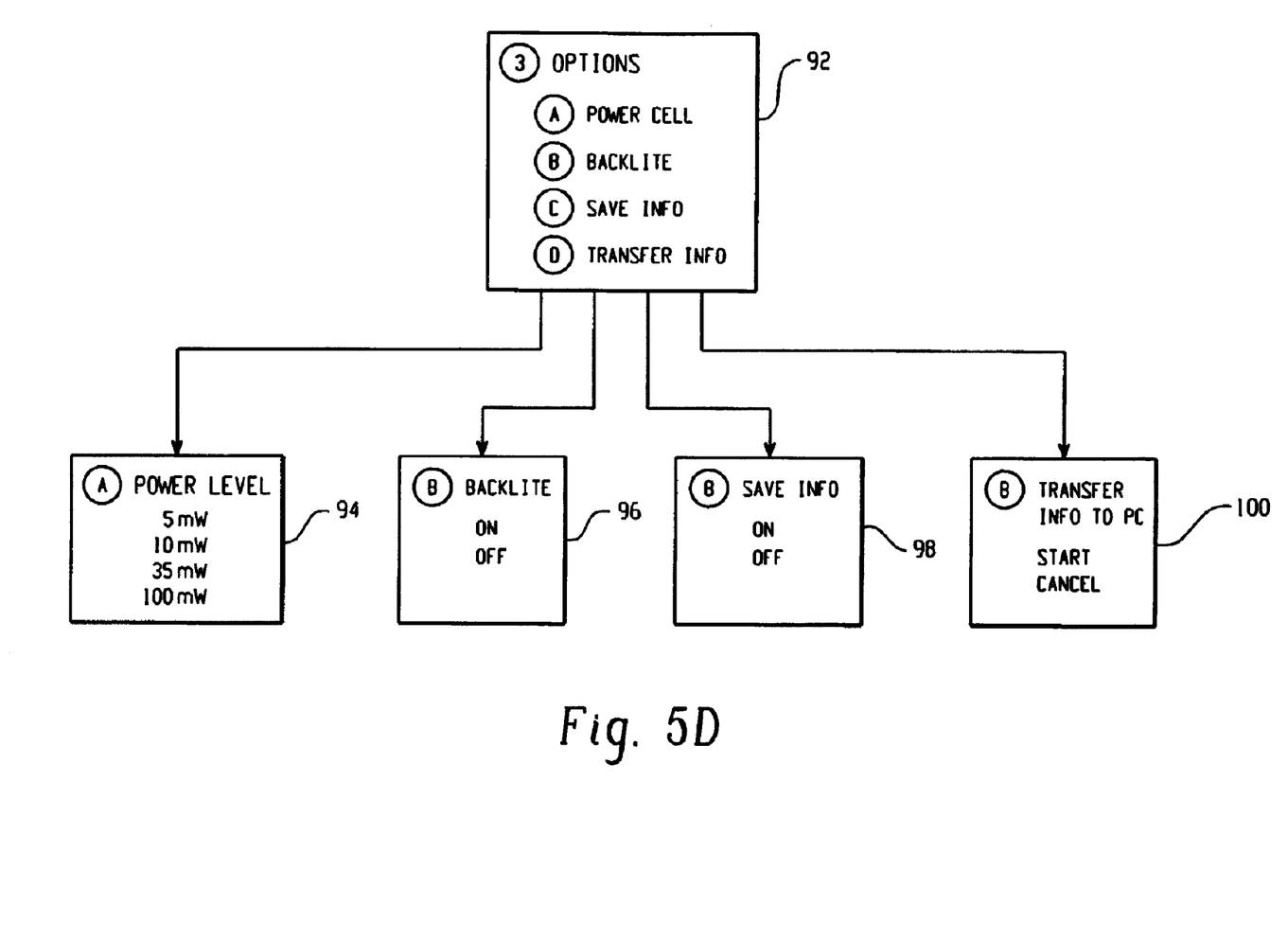

As shown in FIG. 5D, the Options menu 92 allows the control of various functions of the handheld device 30. The Power Level menu 94 controls the operational power level of the device 30, to control battery life and the sensitivity of the device 30. The Backlight menu 96 controls whether the backlighting of the LCD 40 is in an ON or OFF condition. The Save Info menu 98 determines whether the measured values are to be saved, and can optionally be correlated with internal or external time-signatures and measured GPS position data. A Transfer Info to PC menu 100 allows the START and CANCEL of data transfer to a PC, using either a wireless or optional cable connection to a PC. Of course, it is to be appreciated that other functions can be incorporated into the menu selections without departing from the invention.

The above-indicated device components, namely the radio receiver, the processing circuit and the user interface, are all retained in an enclosure, dimensioned to be handheld by the user. In the preferred embodiment, the enclosure is a plastic case having a case top 44 and a case bottom 46 that engage each other to enclose the components. Preferably, the enclosed plastic case would have dimensions of about seven inches in length, four inches and width and one inch in thickness.

In addition to the above-noted benefits, the invention can also be used on security "sniffer" device for WLANs installed in a building. The invention can be used outside the building to determine if the wireless network can be accessed from the outside. The present handheld device is much smaller than a previous-type laptop operated system, and thus much more flexible and portable to use. It would also have a longer run time since it lacks a hard drive, a large LCD and other such power-consuming components. Also, such a device would be less expensive to manufacture and deploy.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

I claim:

1. A handheld mobile wireless monitoring apparatus comprising:
    a wireless receiver for receiving a wireless signal across at least one wireless channel;
    a user interface comprising an input for receiving data indicative of a selected predetermined parameter of the wireless signal to be evaluated and a display;

a processing circuit coupled to the user interface for evaluating the selected predetermined parameter of the wireless signal responsive to the data indicative of the selected predetermined parameter and to display the evaluated predetermined parameter on the user interface;

an enclosure, dimensioned to be handheld by the user, for retaining the radio receiver, the processing circuit and the user interface;

wherein the selected predetermined parameter of the wireless signal to be evaluated is selected from one of a group consisting of data rate, channel bandwith, signal direction, Wired Equivalent Privacy (WEP) number of packets transmitted and number of packet errors.

2. The apparatus of claim 1 wherein the wireless receiver is a wireless PC card for monitoring wireless signals operating under the IEEE 802.11 protocols.

3. The apparatus of claim 1 wherein the processing circuit comprises a microprocessor.

4. The apparatus of claim 1 wherein the user interface comprises an LCD display for displaying data about the at least one property of the wireless signal.

5. The apparatus of claim 1 wherein the user interface comprises a keypad for selecting the predetermined parameter of the wireless signal to be observed.

6. The apparatus of claim 1, further comprising:
the user interface adapted to receive a Wired Equivalent Privacy (WEP) key for the wireless signal; and
the processing circuit is configured to be responsive to the user interface receiving the WEP key to determine the WEP status of the wireless signal being monitored based on the received WEP key.

7. A method of mobile monitoring comprising:
receving a wireless signal across at least one wireless channel with a handheld mobile wireless monitoring appratus;
selecting a predetermined parameter of the wireless signal to be evaluated using the handheld mobile wireless monitoring appratus;
evaluating the wireless signal to observe the predetermined parameter by the handheld mobile wireless monitoring appratus; and
displaying the evaluated predetermined parameter of the wireless signal via the handheld mobile wireless monitoring appratus;
wherein the evaluated predetermined parameter of the wireless signal is one of a group consisting of data rate, channel bandwith, signal direction, Wired Equivalent Privacy (WEP) number of packets transmitted and number of packet errors.

8. The method of claim 7 wherein the steps of monitoring, selecting, evaluating and displaying are performed at a first predetermined location, and wherein the method further comprises performing the steps of mointoring, selecting, evaluating and displaying at least a second predetermined location, so as to observe the predetermined parameter over a predetermined region comprised of the repective predetermined locations.

9. The method of claim 7 wherein the monitored wireless signals operate under the IEEE 802.11 protocols.

10. The method of claim 7, further comprising:
receiving a Wired Equivalent Privacy (WEP) key; and
determining the WEP status of the wireless signal based on the WEP key.

11. The method of claim 7, further comprising determining a gap in signal coverage exists when the wireless signal is detected and the predetermined parameter is not detected.

12. A handheld apparatus, comprising:
means for receiving a wireless signal;
means for obtaining a predetermined parameter of the wireless signal to monitor;
means for evaluating the predetermined parameter of the wireless signal responsive to the means for obtaining; and
enclosing means for retaining the means for receiving, means for obtaining, and means for evaluating;
wherein the predetermined parameter of the wireless signal to be evaluated is selected from one of a group consisting of data rate, channel bandwith, signal direction, Wired Equivalent Privacy (WEP) number of packets transmitted and number of packet errors.

13. The apparatus of claim 12, further comprising means for displaying the evaluation of the predetermined parameter enclosed within the enclosing means.

14. The apparatus of claim 12, wherein the wireless signal is an IEEE 802.11 protocol compliant signal.

* * * * *